(12) United States Patent
McGee

(10) Patent No.: US 8,882,068 B2
(45) Date of Patent: Nov. 11, 2014

(54) BOAT TRANSDUCER MOUNTING APPARATUS

(71) Applicant: Troy A. McGee, Coker, AL (US)

(72) Inventor: Troy A. McGee, Coker, AL (US)

(*) Notice: Subject to any disclaimer, the term of this patent is extended or adjusted under 35 U.S.C. 154(b) by 9 days.

(21) Appl. No.: 13/646,672

(22) Filed: Oct. 6, 2012

(65) Prior Publication Data
US 2013/0221176 A1 Aug. 29, 2013

Related U.S. Application Data

(63) Continuation-in-part of application No. 13/405,338, filed on Feb. 26, 2012.

(51) Int. Cl.
*A47F 5/00* (2006.01)
*F16M 13/02* (2006.01)
*B63B 49/00* (2006.01)

(52) U.S. Cl.
CPC .......... *F16M 13/02* (2013.01); *B63B 2221/08* (2013.01); *B63B 49/00* (2013.01)
USPC ................ 248/300; 248/640; 52/715; 52/713

(58) Field of Classification Search
USPC ........ 248/200, 300, 217.3, 218.4, 219.1, 219, 248/219.3, 219.4, 220.1, 227.32, 231.41, 248/229.11, 229.21, 228.2, 230.2, 231.31, 248/640, 641, 643; D8/354, 373, 349, 371; 52/715, 713
See application file for complete search history.

(56) References Cited

U.S. PATENT DOCUMENTS

| | | | | |
|---|---|---|---|---|
| 471,610 A * | 3/1892 | Hart | | 403/403 |
| 491,091 A * | 2/1893 | Drake | | 122/510 |
| 501,564 A * | 7/1893 | Goodyear | | 403/403 |
| 625,427 A * | 5/1899 | Stewart et al. | | 403/190 |
| D33,335 S * | 10/1900 | Gallaway | | D6/503 |
| 875,755 A * | 1/1908 | Wanner | | 403/231 |
| 939,005 A * | 11/1909 | Goedeke | | 217/69 |
| 939,368 A * | 11/1909 | Withem | | 122/510 |
| 1,000,160 A * | 8/1911 | Dunham | | 52/656.9 |
| 2,055,285 A * | 9/1936 | Ford | | 248/300 |
| 2,321,221 A * | 6/1943 | Linehan | | 403/230 |
| 3,555,750 A * | 1/1971 | Banse | | 52/97 |
| 3,966,056 A * | 6/1976 | Larson | | 211/134 |
| 4,032,242 A * | 6/1977 | Morris | | 403/231 |
| 4,104,356 A * | 8/1978 | Deutsch et al. | | 264/297.9 |
| 4,339,106 A * | 7/1982 | Navarro | | 249/219.1 |
| 4,393,568 A * | 7/1983 | Navarro | | 29/432 |
| 4,589,792 A * | 5/1986 | Niziol | | 403/11 |
| 5,544,866 A * | 8/1996 | Dye | | 256/69 |
| 5,546,726 A * | 8/1996 | Stalzer | | 52/702 |
| D375,038 S * | 10/1996 | Trevorrow | | D8/354 |
| 5,641,240 A * | 6/1997 | Grieser et al. | | 403/403 |
| D393,408 S * | 4/1998 | Mladineo | | D8/354 |
| 5,737,887 A * | 4/1998 | Smeenge | | 52/282.2 |
| 5,860,759 A * | 1/1999 | Leicht | | 403/334 |
| 5,885,024 A * | 3/1999 | Zupan et al. | | 403/389 |
| H1795 H * | 7/1999 | Leek | | 52/712 |

(Continued)

*Primary Examiner* — Kimberly Wood

(57) ABSTRACT

An apparatus for mounting a transducer on a boat includes a v-shaped body having a transducer mounting portion defined in one leg and a mounting opening defined in a second leg. The apparatus can be mounted on a boat by positioning the apparatus close to the boat and connecting the apparatus to the boat using the mounting opening and a conventional nut, bolt, and washer assembly. A transducer can be mounted to the apparatus either before or after it is mounted to the boat.

7 Claims, 10 Drawing Sheets

(56) References Cited

U.S. PATENT DOCUMENTS

| | | | | |
|---|---|---|---|---|
| D414,398 S | * | 9/1999 | Benz et al. | D8/354 |
| 6,018,923 A | * | 2/2000 | Wendt | 52/712 |
| D427,894 S | * | 7/2000 | Benz et al. | D8/382 |
| 6,390,719 B1 | * | 5/2002 | Chan | 403/205 |
| 6,474,901 B1 | * | 11/2002 | Thurston | 403/381 |
| 6,585,448 B2 | * | 7/2003 | Grossman et al. | 403/403 |
| 6,688,069 B2 | * | 2/2004 | Zadeh | 52/715 |
| 6,783,102 B2 | * | 8/2004 | Kirschner | 248/75 |
| D548,571 S | * | 8/2007 | Bigelow et al. | D8/349 |
| D556,018 S | * | 11/2007 | Curtas et al. | D8/354 |
| D556,028 S | * | 11/2007 | Rodder | D8/373 |
| D571,642 S | * | 6/2008 | Rodder | D8/373 |
| D598,272 S | * | 8/2009 | Tejszerski | D8/349 |
| 7,918,054 B2 | * | 4/2011 | Grafton et al. | 52/92.3 |
| D649,016 S | * | 11/2011 | Rasmussen | D8/354 |
| 8,210,486 B2 | * | 7/2012 | Dodane | 248/214 |
| 8,234,826 B1 | * | 8/2012 | Proffitt, Jr. | 52/293.3 |
| 8,356,453 B2 | * | 1/2013 | Rice | 52/745.09 |
| D692,469 S | * | 10/2013 | Oetlinger | D15/138 |
| 2002/0100226 A1 | * | 8/2002 | Huppert | 52/23 |
| 2008/0080957 A1 | * | 4/2008 | James et al. | 411/433 |
| 2010/0180531 A1 | * | 7/2010 | Arivett et al. | 52/643 |

* cited by examiner

US 8,882,068 B2

BOAT TRANSDUCER MOUNTING APPARATUS

CROSS-REFERENCE TO RELATED APPLICATIONS

The present application is a continuation-in-part patent application of U.S. nonprovisional patent application Ser. No. 13/405,338, filed on Feb. 26, 2012 and entitled "Boat Transducer Mounting Apparatus." The '338 application is hereby incorporated by reference into the present application.

BACKGROUND OF THE INVENTION

The present invention relates generally to apparatuses that can be used to mount a transducer on a boat. More specifically, the present invention pertains to an apparatus that can be used to mount a transducer on a boat without damaging the boat.

Transducers for boats are well known in the art. These devices are usually mounted to boats using bolts that damage the boat by leaving bolt holes when the transducer is removed. The damaged portions of the boat can be unsightly and diminish the value of the boat if it is ever sold by its current owner. As a result, there is a need for a way to mount a transducer to a boat that does not cause damage to the boat.

SUMMARY OF THE INVENTION

The present invention is directed toward an apparatus that can be used to mount a transducer to a boat without causing damage to the boat. In one embodiment, the apparatus includes a pair of slotted portions adjustably connected to one another. One of the slotted portions includes a transducer mounting portion, which can be used to mount a transducer to the apparatus. The apparatus can be mounted to a boat by positioning the apparatus close to the boat and then adjusting the slotted portions so that slots included in these portions engage with the boat and hold the apparatus in place. In one embodiment, the apparatus is designed so that it can be positioned close to the transom (or Jack Plate) of a boat and then adjusted so that the slots engage with and clamp down on the transom (or the Jack Plate). In another embodiment, the apparatus includes a single v-shaped body having a transducer mounting portion defined in one leg of the v-shaped body and a mounting opening defined in a second leg of the v-shaped body. This embodiment can be mounted to a boat using the mounting opening and a conventional nut, bolt, and washer assembly.

DETAILED DESCRIPTION OF THE INVENTION

Figure 1:
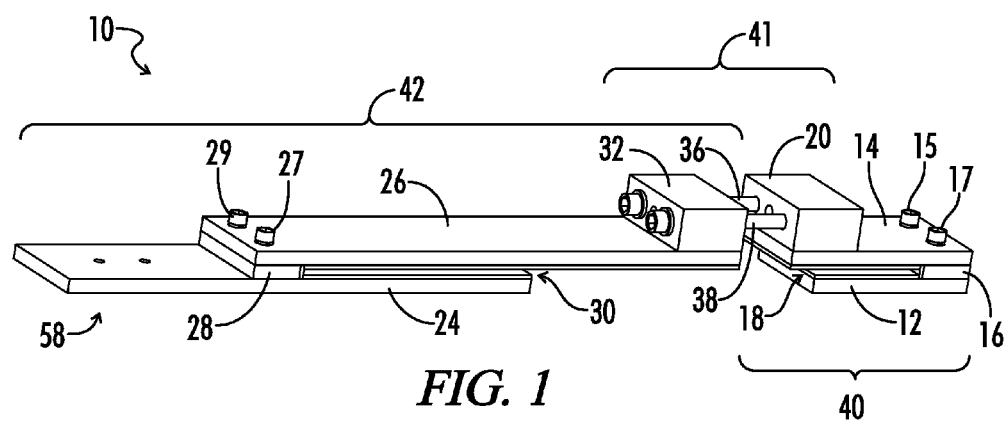
FIG. 1 is a side view of one embodiment of the present invention.
Figure 2:
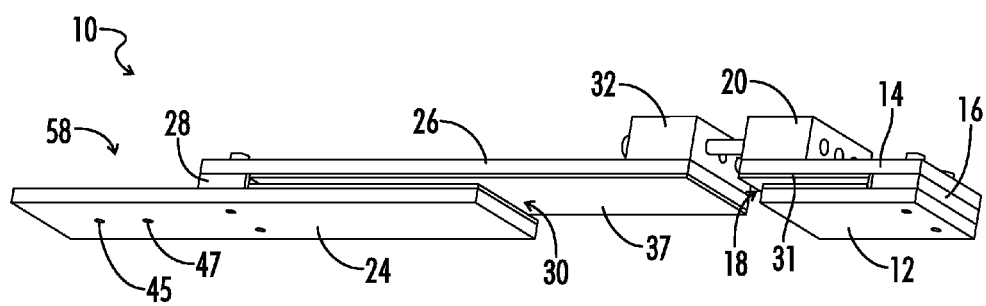
FIG. 2 is a back view of the embodiment shown in FIG. 1.
Figure 3:
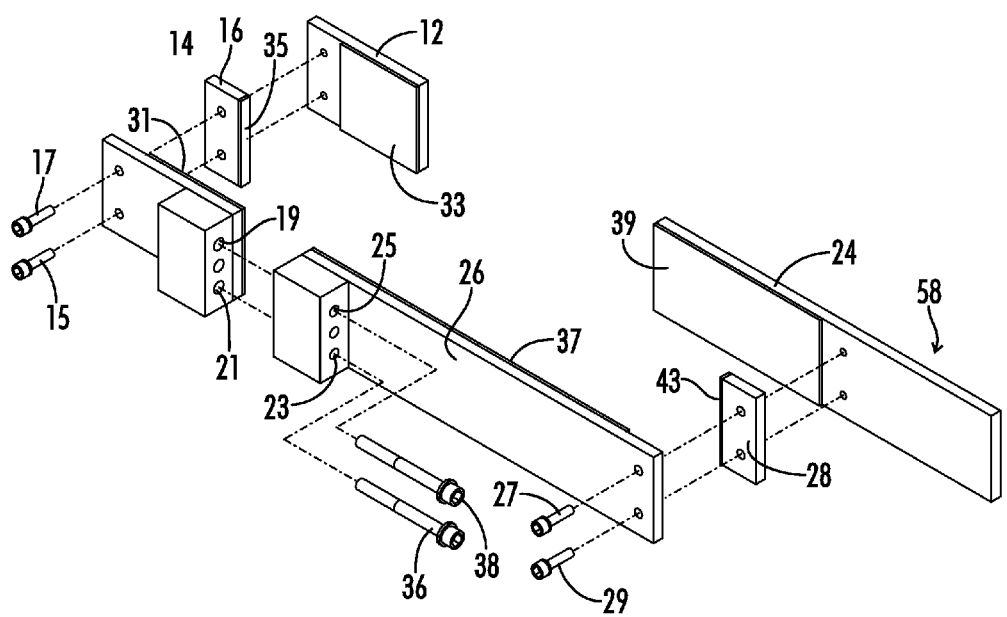
FIG. 3 is an exploded view of the embodiment shown in FIG. 1.
Figure 4:
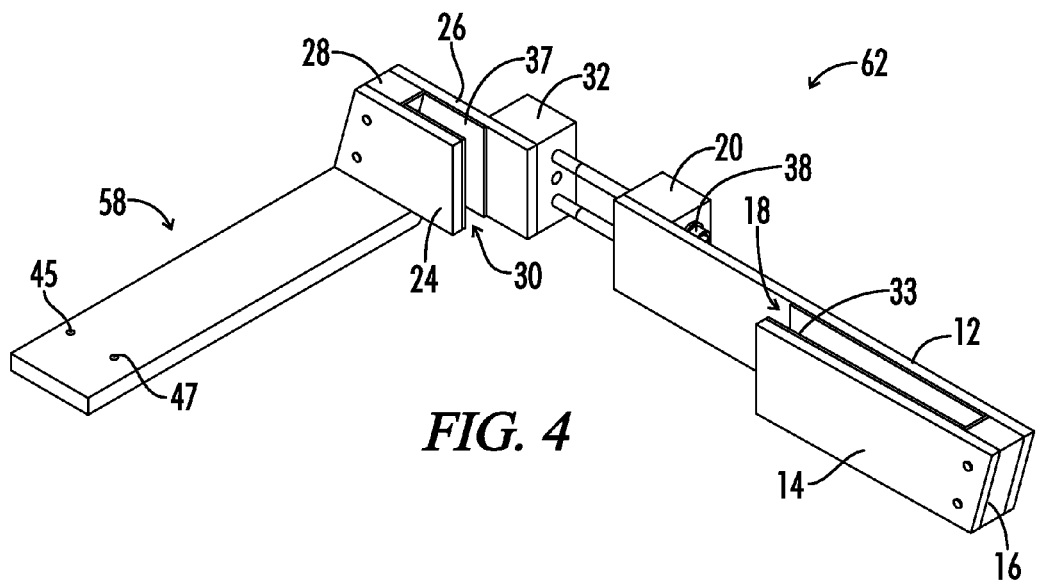
FIG. 4 is a front view of a second embodiment of the present invention.
Figure 5:
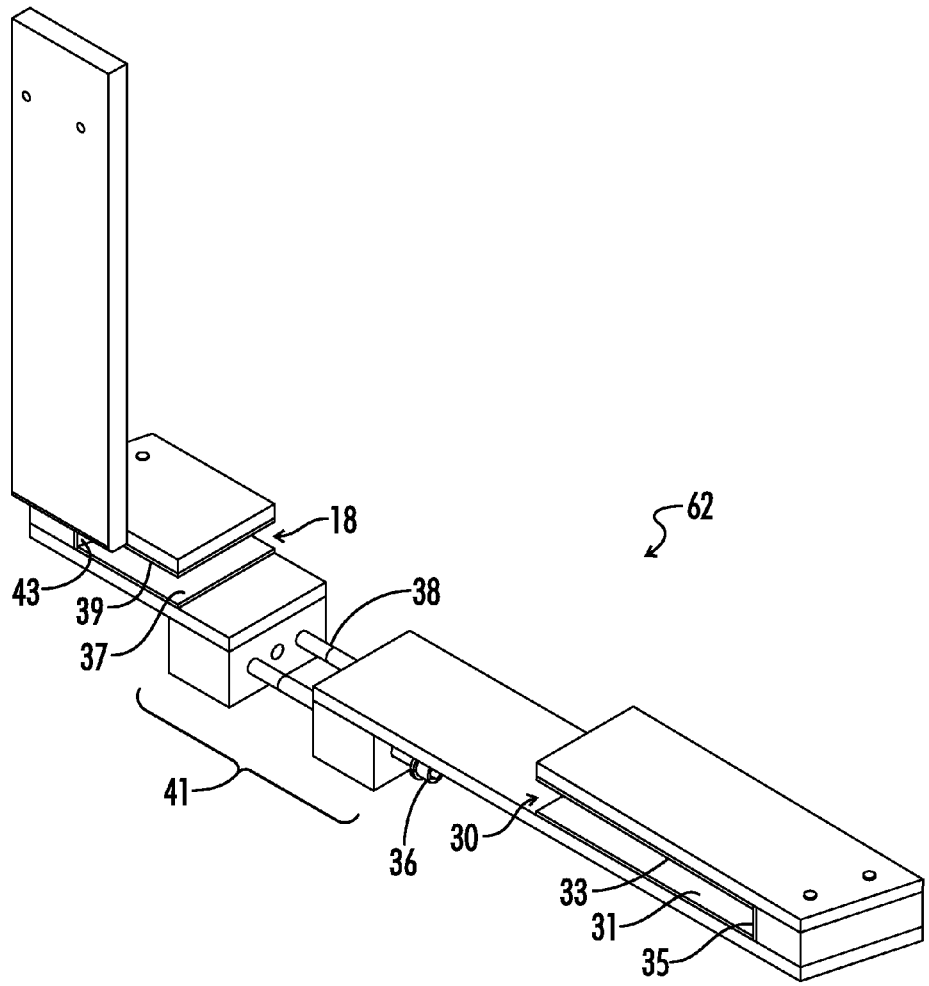
FIG. 5 is a side view of the second embodiment shown in FIG. 4.
Figure 6:
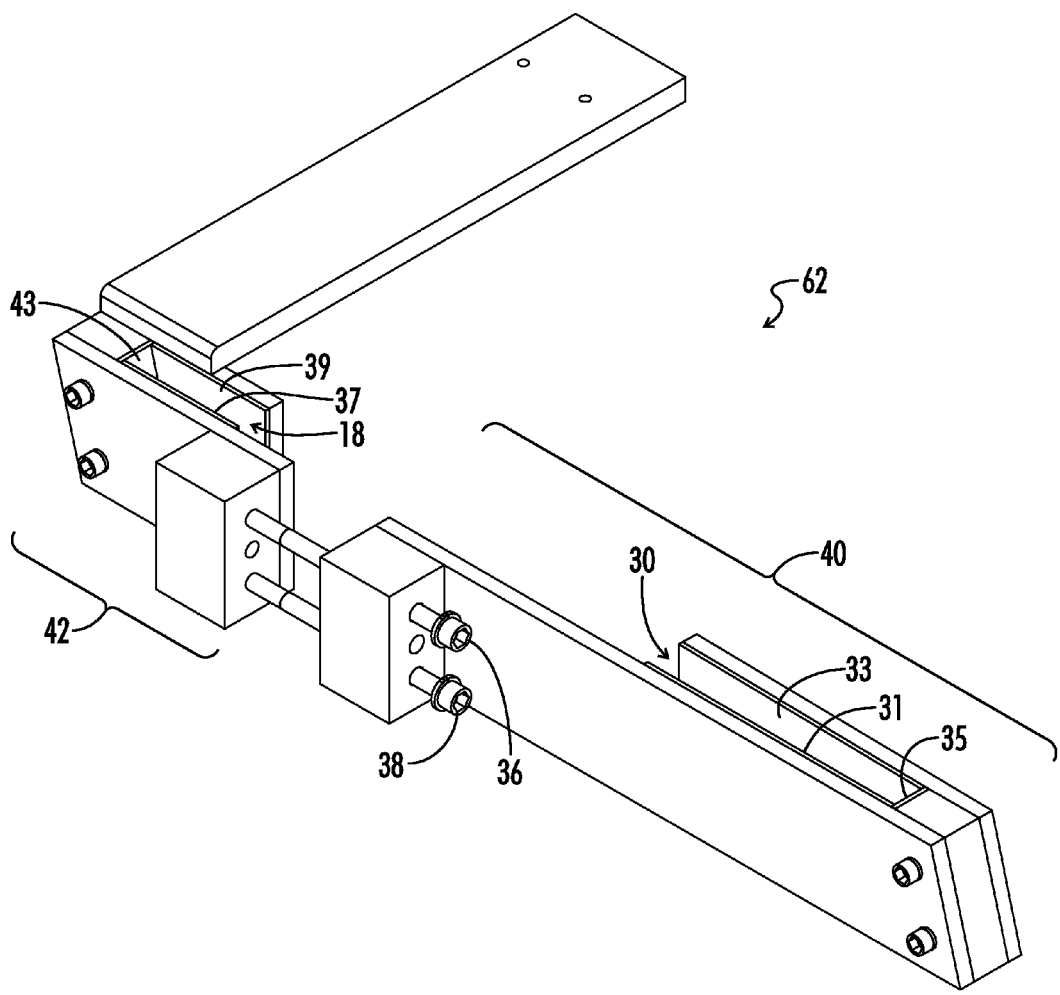
FIG. 6 is a back view of the second embodiment shown in FIG. 4.
Figure 7:
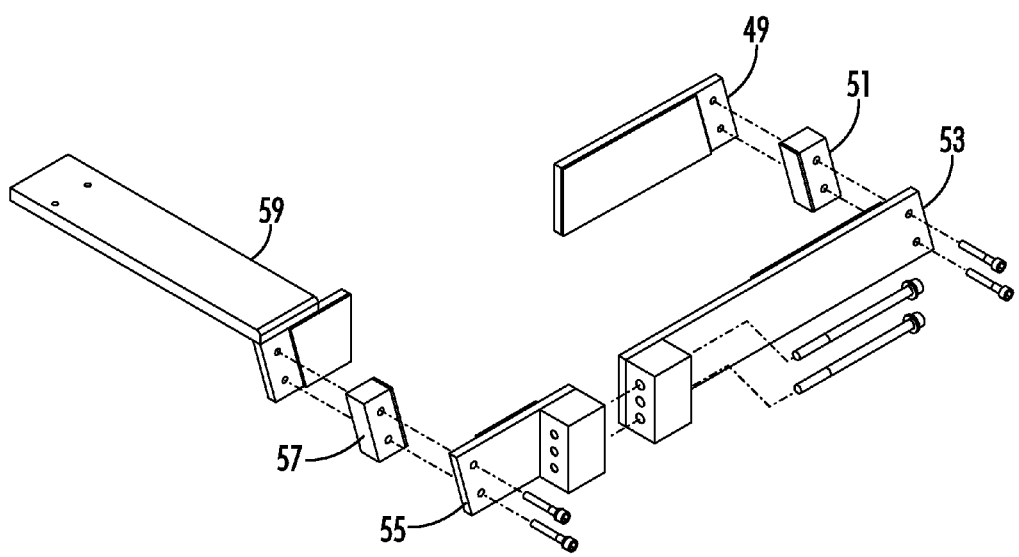
FIG. 7 is an exploded view of the embodiment shown in FIG. 4.
Figure 8:
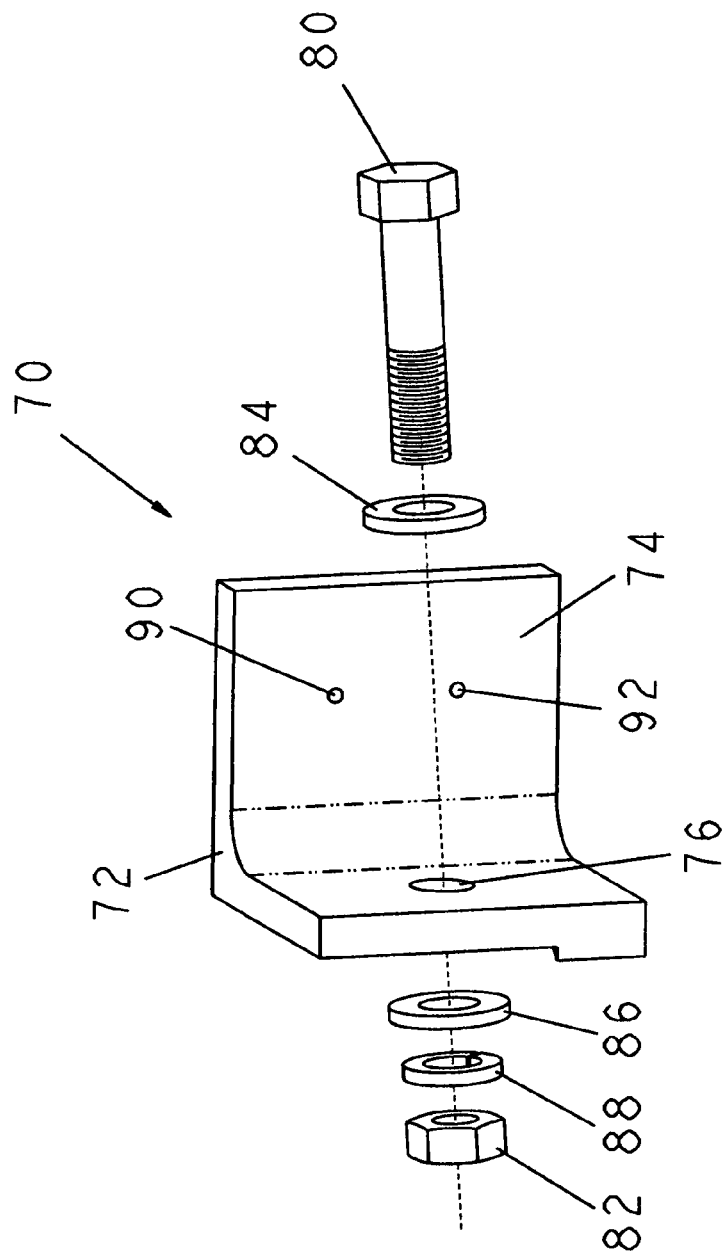
FIG. 8 is a front view of a third embodiment of the present invention.
Figure 9:
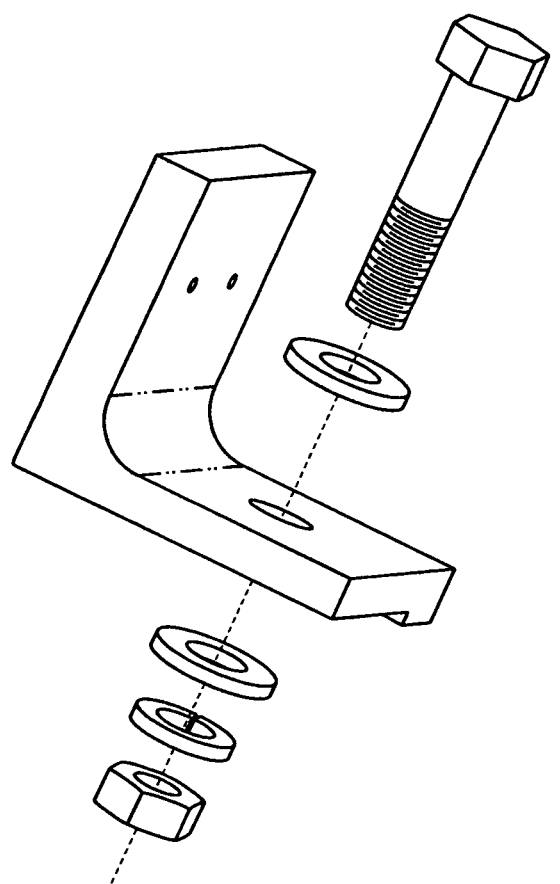
FIG. 9 is a top view of the embodiment shown in FIG. 8.
Figure 10:
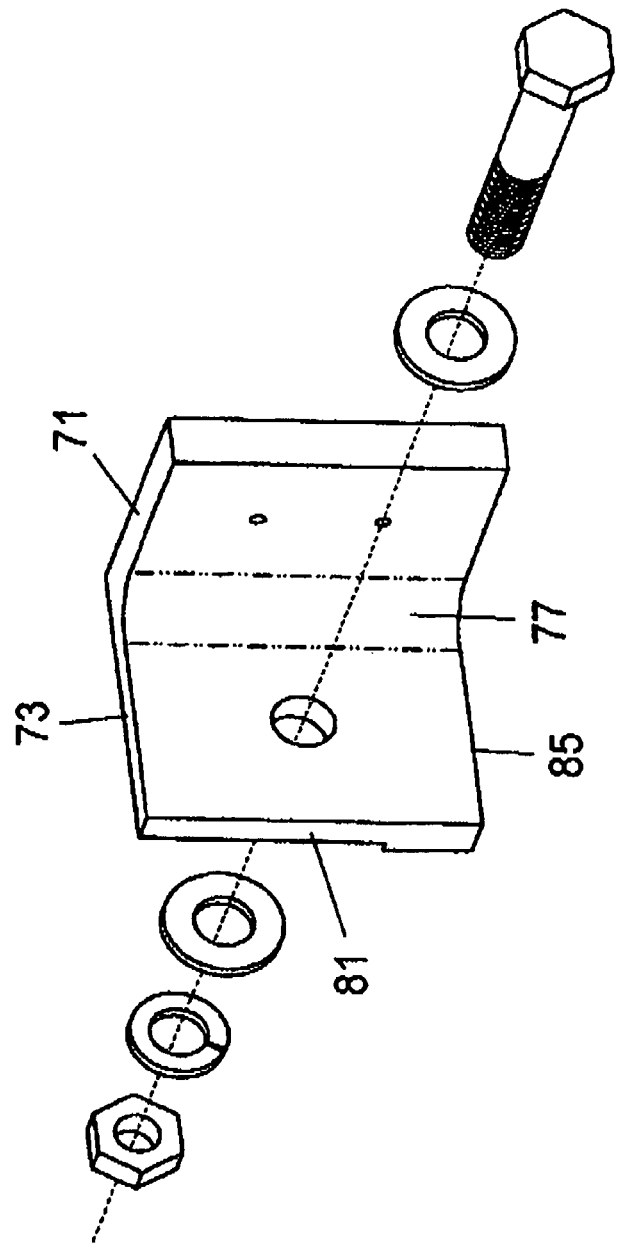
FIG. 10 is a right side view of the embodiment shown in FIG. 8.
Figure 11:
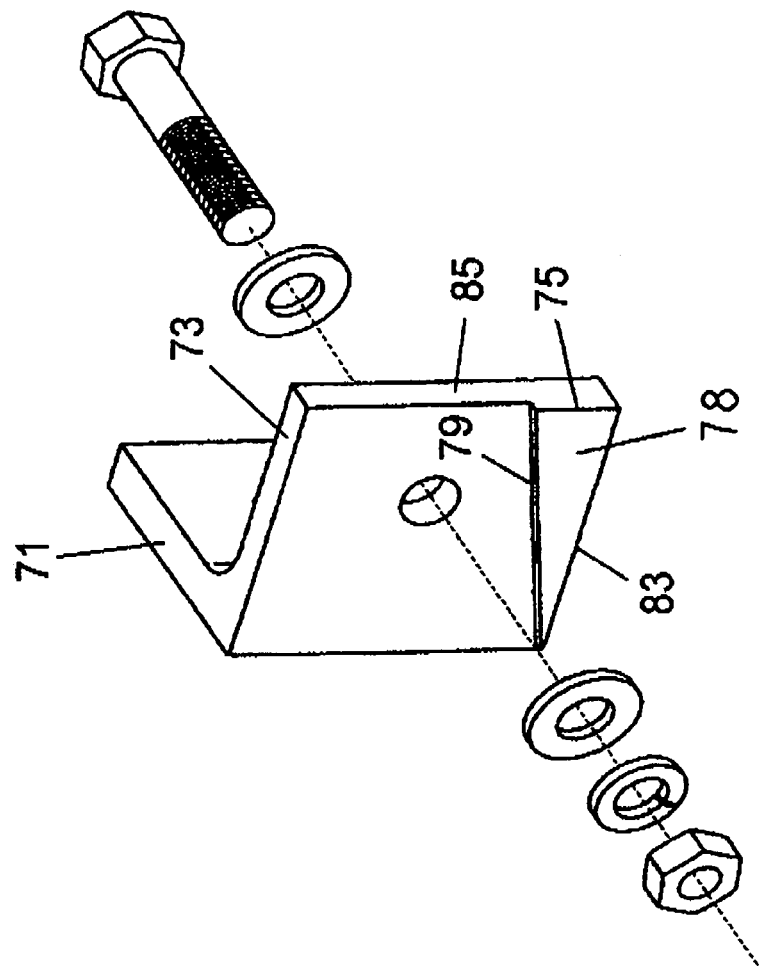
FIG. 11 is a left side view of the embodiment shown in FIG. 8.

Referring to FIGS. 1-3, one embodiment of the present invention, apparatus 10, includes a first plate (or first leg) 12 connected to a second plate (or second leg) 14 using a first spacer 16 to form a first slot 18, a threaded block 20 located on one end of the second plate 14, a third plate (or third leg) 24 connected to a fourth plate (or fourth leg) 26 using a second spacer 28 to form a second slot 30, and a mounting block 32 located on one end of the fourth plate 26 and adjustably connected to the threaded block 20 using a pair of bolts, 36 and 38.

The first plate 12, second plate 14, and first spacer 16 may be manufactured out of steel and connected together using a pair of bolts, 15 and 17. These components may also be integrated into a single piece, referred to as a first slotted portion 40, rather than connected together using bolts. The first slotted portion 40 may or may not include the threaded block 20.

The third plate 24, fourth plate 26, and second spacer 28 may be manufactured out of steel and connected together using a pair of bolts, 27 and 29. These components may also be integrated into a single piece, referred to as a second slotted portion 42, rather than connected together using bolts. The second slotted portion 42 may or may not include the mounting block 32.

The threaded block 20, mounting block 32, and bolts 36 and 38 form an adjustable connecting means 41 adjustably connecting together the first and second slotted portions, 40 and 42, so that the first and second slotted portions, 40 and 42, can be moved inward and outward with respect to one another. Turning bolts 36 and 38 in one direction causes first and second slotted portions, 40 and 42, to move inward toward one another. Turning bolts 36 and 38 in the opposite direction causes the opposite effect, e.g., the first and second slotted portions, 40 and 42, move outward away from one another.

The first plate 12 may include one end aligned with one end of the first spacer and one end of the second plate 14. The first plate 12 may extend outward from the first spacer 16 and be aligned with, parallel to, and overlap with the second plate 14. The first plate 12, first spacer 16, and second plate 14 may have the same width and the second plate 14 may be longer than the first plate 12.

The threaded block 20 may extend perpendicularly outward from one side of the second plate 14. The threaded block 20 and the first spacer 16 may be located on opposite sides and opposite ends of the second plate 14. The threaded block 20 and the second plate 14 may have the same width and the threaded block 20 may include a set of threads, 19 and 21 (see FIG. 3) defined therein.

The fourth plate 26 may include one end aligned with one end of the second spacer 28. The fourth plate 26 may extend outward from the second spacer 28 toward the first slot 18 and may be aligned with, parallel to, and overlap with the third plate 24. The third plate 24, second spacer 28, and fourth plate 26 may have the same width.

The mounting block 32 may extend perpendicularly outward from one side of the fourth plate 26. The mounting block 32 and the second spacer 28 may be located on opposite sides and opposite ends of the fourth plate 26. The mounting block 32 and fourth plate 26 may have the same width and the mounting block 32 may include a set of unthreaded bolt openings, 23 and 25, (see FIG. 3) defined therein.

Apparatus 10 may include thin rubber padded portions, 31, 33, and 35 lining the inner portions of slot 18 and thin rubber padded portions, 37, 39, and 43 lining the inner portions of slot 30. As shown in FIG. 2, thin rubber portion 37 may extend out from slot 30 along the length of fourth plate 26 and thin rubber portion 31 may extend out from slot 18 along the length of second plate 14.

The third plate 24 may include a transducer mounting portion 58 extending outward from the second spacer 28 away from the first slot 18. Alternatively, as shown in FIGS. 4-7, the transducer mounting portion 58 may be located on one end of a fifth plate 60 extending perpendicularly outward from the third plate 24. The fifth plate 60 may be longer than the third plate 24. In either case, the transducer mounting portion 58 may include a pair of threaded openings, 45 and 47, for using in securing a transducer (not shown) to the transducer mounting portion 58 with a pair of bolts.

The second embodiment of the present invention, apparatus 62, shown in FIGS. 4-7 is very similar to the first embodiment of the invention, apparatus 10, shown in FIGS. 1-3. The main differences relate to the lengths of the first and second plates/legs, 12 and 14, which are longer in the second embodiment, the lengths of the third and fourth plates/legs, 24 and 26, which are shorter in the second embodiment, and the location of the transducer mounting portion 58, which is located on the fifth plate 60 in the second embodiment rather than being included as part of the third plate 24 in the first embodiment. In the second embodiment, the aligned ends, 49, 51, and 53 (see FIG. 7), of first plate 12, second plate 14, and spacer 16 are slanted with respect to the opposite ends of these pieces and the aligned ends, 55, 57, and 59, of third plate 24, fourth plate 26, and spacer 28 are slanted in a similar manner.

As shown in FIGS. 1 and 2, the first and second slots, 18 and 30, may be located in a single plane with the first slot 18 extending outward from the first spacer 16 toward the second slot 30 and the second slot 30 extending outward from the second spacer 28 toward the first slot 18. Slots 18 and 30 may be sized so that they can fit over and engage with a transom (or a Jack Plate) typically included on a boat. Slots 18 and 30 may also be sized to fit over and engage other parts of a boat in other embodiments.

The first, second, third, fourth, and fifth plates, 12, 14, 24, 26, and 60 may be elongated, flat and rectangular, and the first and second spacers, 16 and 28, may be flat and rectangular. Spacers 16 and 28 may also be flat slanted rectangles as shown FIG. 7.

In use, the first embodiment, apparatus 10, may be connected to a boat (not shown) by positioning the embodiment 10 so that first and second slots, 18 and 30, overlap the transom (or the Jack Plate) of a boat and then turning bolts, 36 and 38, so that slots 18 and 30 engage with and clamp down on the transom (or the Jack Plate). A transducer (not shown) is then mounted to the transducer mounting portion 58 using bolts or some other appropriate means. Alternatively, the transducer may be secured to the transducer mounting portion 58 and then the apparatus 10 may be secured to the boat transom (or Jack Plate). This embodiment may be removed by simply turning the bolts, 36 and 38, in the opposite direction until the slots, 18 and 30, disengage from the boat transom (or Jack Plate).

Referring to FIGS. 8-11, a third embodiment of the invention, apparatus 70, includes a single v-shaped body 72 having a transducer mounting portion 74 defined in a first leg 71 of the v-shaped body 72 and a mounting opening 76 defined in a second leg 73 of the v-shaped body 72. The second leg 73 of the v-shaped body 72 may include a triangular shaped lip 78 extending perpendicularly outward from an outer surface of the second leg 73 of the v-shaped body 72 adjacent to mounting opening 76. The triangular-shaped lip 78 may have a thickness that is less than the thickness of the second leg 73 of the v-shaped body 72. The triangular-shaped lip 78 may have a base 75 that is aligned with a first edge 81 of the second leg 73 and one leg 83 that is aligned with a second edge 85 of the second leg 73 and the first and second edges, 81 and 85, may be perpendicular to one another. The triangular-shaped lip 78 may have an area that is less than half of the area of the outer surface of the second leg 73 and the first leg 71 may be thicker than the second leg 73. The v-shaped body 72 may have a concave inner surface 77 (also referred to as a curved inner surface 77 extending between the first and second legs). The combined thickness of the lip 78 and the second leg 73 may be approximately equal to the thickness of the first leg 71, the lip 78 may have a sloped edge 79, and the curved inner surface 77 and the lip 78 may be located on opposite sides of the second leg 73.

The v-shaped body 72 may be manufactured out of steel and connected to a boat using a convention nut, bolt, and washer assembly, which includes bolt 80, nut 82, flat washers 84 and 86, and lock washer 88. Transducer mounting portion 74 may include threaded openings 90 and 92, which can be used to connect a transducer (not shown) to the transducer mounting portion 74 with a pair of bolts (not shown).

In use, apparatus 70 may be connected to a boat by positioning the apparatus 70 so that the triangular lip 78 presses against a portion of the transom (or Jack Plate) included on the boat and mounting opening 76 overlaps an existing bolt opening in the transom (or Jack Plate), and securing the apparatus 70 to the transom (or Jack Plate) using the mounting opening 76 and the nut, bolt, and washer assembly.

Once the apparatus 70 is secured to the boat, a transducer can be connected to the transducer mounting portion 74 using threaded openings 90 and 92 and a pair of bolts. Alternatively, the transducer may be connected to the apparatus 70 and then the apparatus 70 may be connected to the boat.

The above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed is:

1. An apparatus for mounting a transducer on a boat, comprising:
a first substantially flat, rectangular leg;
a second substantially flat, rectangular leg extending perpendicularly outward from the first leg;
a curved inner surface extending between the first and second legs;
a pair of threaded openings defined in the first leg;
a mounting opening defined in the second leg; and
a lip extending perpendicularly outward from an outer surface of the second leg;
wherein the diameter of the mounting opening is greater than the diameter of the threaded openings, the combined thickness of the lip and second leg is approximately equal to the thickness of the first leg, the lip has a thickness that is less than the thickness of the second leg, the lip has a sloped edge, and the lip slopes upward from a point adjacent to where the first and second legs intersect.

2. The apparatus of claim 1, wherein the lip has a base that is aligned with a first edge of the second leg and one leg that is aligned with a second edge of the second leg, the first and second edges being perpendicular to one another.

3. The apparatus of claim 2, wherein the lip has an area that is less than half of the area of the outer surface of the second leg.

4. The apparatus of claim 3, wherein the first leg is thicker than the second leg.

5. The apparatus of claim 4, wherein the first and second legs have the same length.

6. The apparatus of claim 1, wherein the curved inner surface and the lip are located on opposite sides of the second leg.

7. The apparatus of claim 1, wherein the lip is triangular in shape.

\* \* \* \* \*